(12) United States Patent
Haas

(10) Patent No.: US 7,205,050 B2
(45) Date of Patent: Apr. 17, 2007

(54) LOW SHEAR ADHESION RTV SILICONE

(75) Inventor: Hans E. Haas, Stow, OH (US)

(73) Assignee: Permatex, Inc., Solon, OH (US)

( * ) Notice: Subject to any disclaimer, the term of this patent is extended or adjusted under 35 U.S.C. 154(b) by 269 days.

(21) Appl. No.: 10/864,148

(22) Filed: Jun. 9, 2004

(65) Prior Publication Data

US 2005/0020754 A1    Jan. 27, 2005

Related U.S. Application Data

(60) Provisional application No. 60/476,963, filed on Jun. 9, 2003.

(51) Int. Cl.
*B32B 9/04* (2006.01)
*C08L 83/04* (2006.01)

(52) U.S. Cl. .............. 428/447; 428/522; 428/450; 428/463; 524/588; 524/287; 524/306; 528/15; 528/17; 528/18; 528/31; 528/32

(58) Field of Classification Search .............. None
See application file for complete search history.

(56) References Cited

U.S. PATENT DOCUMENTS

| | | | |
|---|---|---|---|
| 4,514,529 A | 4/1985 | Beers et al. | 523/200 |
| 4,528,352 A | 7/1985 | Chung | 528/18 |
| 4,556,595 A | 12/1985 | Ochi | 428/143 |
| 4,673,750 A | 6/1987 | Beers et al. | 549/215 |
| 4,710,405 A | 12/1987 | Graiver et al. | 427/387 |
| 4,735,979 A | 4/1988 | Beers et al. | 524/188 |
| 4,847,396 A | 7/1989 | Beers et al. | 556/421 |
| 5,013,781 A | 5/1991 | Koshii et al. | 524/864 |
| 5,288,891 A | 2/1994 | Sawada et al. | 556/448 |
| 5,346,940 A | 9/1994 | Brassard et al. | 524/267 |
| 5,534,588 A | 7/1996 | Knepper et al. | 524/730 |
| 5,583,170 A * | 12/1996 | Wrobel | 524/140 |
| 5,584,886 A | 12/1996 | Lai | 623/11 |
| 5,747,132 A | 5/1998 | Matsui et al. | 428/41.7 |
| 5,883,184 A * | 3/1999 | Nagaoka | 524/788 |
| 6,020,062 A | 2/2000 | Questel et al. | 428/354 |
| 6,114,438 A | 9/2000 | Lower | 524/788 |
| 6,413,354 B1 * | 7/2002 | Haas et al. | 156/329 |
| 6,482,288 B1 | 11/2002 | Kreckel et al. | 156/247 |
| 6,562,180 B1 | 5/2003 | Bohin et al. | 156/329 |

FOREIGN PATENT DOCUMENTS

| | | |
|---|---|---|
| EP | 0 220 809 | 8/1986 |
| GB | 1 581 727 | 12/1980 |
| JP | 409217010 A | 8/1997 |
| WO | WO 93/19130 * | 9/1993 |

OTHER PUBLICATIONS

"Homogeneous Platinum Catalysts." United Chemical Technologies, Inc.

* cited by examiner

*Primary Examiner*—Marc S. Zimmer
(74) *Attorney, Agent, or Firm*—Gifford, Krass, Sprinkle, Anderson & Citkowski, P.C.

(57) ABSTRACT

An RTV seal forming silicone composition has a silicone base material that includes a lipophilic secondary phase insoluble in the silicone base material upon cure thereof. The resulting silicone has a shear adhesion strength as measured by transverse displacement of less than 50 pounds per square inch allowing for polymerized silicone removal without damage to an oil pan assembly.

29 Claims, No Drawings

LOW SHEAR ADHESION RTV SILICONE

RELATED APPLICATION

This application claims priority of U.S. Provisional Patent Application Ser. No. 60/476,963 filed Jun. 9, 2003, which is incorporated herein by reference.

FIELD OF THE INVENTION

The present invention generally relates to RTV silicone having a shear adhesion value of less than 50 pounds per square inch and in particular, to RTV silicone having a shear adhesion value of less than 40 pounds per square inch that has equal or greater joint movement properties relative to conventional RTV silicones.

BACKGROUND OF THE INVENTION

RTV silicone presently is the preeminent material in forming vehicle power train seals that include oil pan-, valve cover- and transmission pan-seals. RTV silicone supplanted cork and felt in these applications due to the ease of application and superior oil resistance. Further, the tack of RTV silicones allows one to position two surfaces to be joined, leaving one's hands free to insert fasteners to secure seal surfaces. Further, RTV silicone forms seals that need not be torque adjusted to the same extent as sheet-based seal materials.

RTV silicone has developed over the years to increase adhesive properties and oil resistance. These enhanced properties have led to service lifetimes for some RTV silicones in excess of 100,000 miles of vehicle usage. However, the adhesion properties of RTV silicones have increased to the point that removal of a silicone gasket often destroys or damages vehicle components in the process. Flange surfaces often become distorted, scratched or gouged during the seal removal process thereby making a new seal less reliable. Thus, there exists a need for an RTV silicone that affords the same joint movement and oil resistance of conventional RTV silicones with the property of shear adhesion values of 50 pounds per square inch or less.

SUMMARY OF THE INVENTION

An RTV seal forming silicone composition has a silicone base material that includes a lipophilic secondary phase insoluble in the silicone base material upon cure thereof. The resulting silicone has a shear adhesion strength as measured by transverse displacement of less than 50 pounds per square inch allowing for polymerized silicone removal without damage to an oil pan assembly.

A seal structure according to the present invention is formed with a conventional RTV silicone or an RTV silicone containing the above-mentioned lipophilic secondary phase along with a sacrificial primer applied to a substrate surface where the sacrificial primer has a shear adhesion strength of less than 50 pounds per square inch and is a film forming polymer such as a silicone, a silicate, a polysulfide and an acrylic.

DETAILED DESCRIPTION OF THE PREFERRED EMBODIMENTS

The present invention has utility as an RTV silicone especially well suited for the formation of high elongation, oil-resistant seals. The present invention utilizes a conventional silicone base material and reduces shear adhesion strength through the addition of a secondary insoluble phase. Base RTV compositions that benefit from the present invention include both condensation and addition catalyzed silicone polymers.

Adhesion shear strength is defined herein as the amount of energy required to pull a first substrate transversely from a second substrate after being normalized for adhesive surface area.

A secondary insoluble phase is defined herein to be a lipophilic component or series of components within an RTV silicone curable composition that at least in part segregate into an immiscible phase upon cure, wherein the immiscible phase makes up less than 50% total weight percent of the RTV composition.

Preferably, the present invention achieves shear adhesion strength of less than 50 psi and preferably between 15 and 35 psi while also reducing the tensile strength of an inventive RTV silicone.

In an inventive embodiment of a one-part condensation catalyzed RTV, the present invention includes a base silicone fluid. As used herein, "silicone fluid" includes room temperature condensation curing silicone polymers. These polymers cure/vulcanize with moisture from ambient air over a wide temperature range. Representative silicone fluid polymers conventional to the art typically contain functional groups capable of reacting with ambient moisture to substantially induce cure. Representative of such polymers are diorganopolysiloxanes terminated with polyalkoxy, oximino, carboxy or silanol termini. It is appreciated that other silicone fluids are operative herein provided that upon cure the resulting composition has the oil resistance and elongation properties of those compositions disclosed in U.S. Pat. No. 4,514,529, which is incorporated herein by reference. A conventional silicone fluid used herein typically has a viscosity in the range from about 100 to about 400,000 centipoise when measured at 25° C.

The present invention also includes effective amounts of a condensation catalyst conventional to the art to facilitate silicone fluid adherence to an RTV silicone. A condensation catalyst is typically present from about 0.001 to 1 part per hundred parts of diorganopolysiloxane. Condensation catalysts conventional to the art and operative herein representatively include organometallics of the metals including tin, zirconium, lead, iron, cobalt, manganese, antimony, bismuth and zinc. Representative of these organometallic condensation catalysts are dibutyl tin dilaurate, dibutyl tin diacetate, dibutyl tin dimethoxide, tin oleate, dibutyl tin maleate, and combinations thereof; titanium compounds such as 1,3-propanedioxytitanium bis(ethylacetoacetate), 1,3-propanedioxytitanium bis(acetylacetonate), diisopropoxytitanium bis(acetylacetonate), titanium naphthenate, tetrabutyltitanate, tetra-2-ethylhexyltitanate, tetraphenyltitanate, tetraoctadecyltitante, ethyltriethanolaminetitanate, and β-dicarbonyltitanium compounds; organozirconium compounds such as zirconium octoanate; and esters of the above-recited organometallics, the esters illustratively including 2-alkyl octoanate, alkyl hexoanate; carboxylates illustratively including octoanate, stearate, and naphthenate. Non-metallic condensation catalysts conventional to the art and operative herein include primary, secondary or tertiary amines, illustratively including hexylammonium acetate, aminopropyltrialkoxysilane and benzyltrimethyl ammonium acetate.

An inventive RTV silicone also includes a crosslinker. Any conventional crosslinker known to the art that is capable of reaction with a silicone fluid according to the present invention at room temperature under condensation cure conditions is operative herein. A crosslinker operative in the present invention illustratively includes methyltrimethoxysilane, vinyltrimethoxysilane, methyltriethoxysilane, vinyltriethoxysilane, methyltriacetoxysilane, vinyltriethoxysilane, methyltriacetoxysilane, methyl tris-(N-methylbenzamido)silane, methyl tris-(isopropenoxy)silane, methyl tris (cyclohexylamino)silane, methyl tris-(methyl ethyl ketoximino)silane, vinyl tris-(methyl ethyl ketoximino)silane, methyl tris-(methyl isobutyl ketoximino)silane, vinyl tris-(methyl isobutyl ketoximino)silane, tetrakis-(methyl ethyl ketoximino)silane, tetrakis-(methyl isobutyl ketoximino)silane, tetrakis-(methyl amyl ketoximino)silane, dimethyl bis-(methyl ethyl ketoximino) silane, methyl vinyl bis-(methyl ethyl ketoximino)silane, methyl vinyl bis-(methyl isobutyl ketoximino)silane, methyl vinyl bis-(methyl amyl ketoximino)silane, tetrafunctional alkoxy-ketoxime silanes, tetrafunctional alkoxy-ketoximino silanes and enoxysilanes.

In an inventive embodiment of a two-part addition catalyzed RTV, Part A includes a platinum group catalyst, Part B includes a (silyl) SiH polyorganosiloxane polymer and a SiH crosslinker. A vinyl terminated polyorganosiloxane polymer is present in at least one of Part A and Part B.

A platinum type catalyst includes platinum and/or rhodium compounds. Representative conventional catalyst compounds are disclosed in U.S. Pat. Nos. 3,159,602; 3,220,972; 3,419,593; and 3,814,730. The amount of catalyst is typically present between 2 and 500 parts per million of platinum or rhodium relative to total weight of vinyl- and silyl-polyorganosiloxanes present.

Silyl containing polyorganosiloxanes are well known in the art and illustratively include $C_1$–$C_4$ dialkyl polyorganosiloxanes containing $Si(CH_3)_2H$ termini, hydrogen $C_1$–$C_4$ alkyl polysiloxanes containing $Si(CH_3)_3$ termini, copolymers having $C_1$–$C_4$ dialkyl hydrogen $C_1$–$C_4$ alkyl polysiloxane units with $Si(CH_3)_2H$ termini, copolymers having $C_1$–$C_4$ dialkyl hydrogen $C_1$–$C_4$ alkyl polysiloxane units with $Si(CH_3)_2$ H termini, and cyclic hydrogen $C_1$–$C_4$ polysiloxanes. Typically, $C_1$–$C_4$ alkyl groups in each occurrence are methyl. It is appreciated that a polyorganosiloxane containing more than two reactive SiH bonds is operative in a two-part RTV as a crosslinker.

Vinyl terminated polyorganosiloxanes operative in forming RTV silicones are well known to the art and illustratively include $C_1$–$C_4$ dialkylpolysiloxanes containing dimethylvinyl silyl termini, $C_1$–$C_4$ alkyl vinyl $C_1$–$C_4$ dialkyl polysiloxane copolymers with $Si(CH_3)_3$ termini, $C_1$–$C_4$ alkyl vinyl $C_1$–$C_4$ dialkyl polysiloxane copolymers with $Si(C_1$–$C_4)$ dialkyl (C=$CH_2$) termini, and cyclic $C_1$–$C_4$ alkyl vinyl polysiloxanes. Typically $C_1$–$C_4$ alkyl groups are in each occurrence methyl. It is appreciated that a polyorganosiloxane containing more than two reactive vinyl groups is operative in a two-part RTV as a crosslinker. Typical vinyl containing polydiorganosiloxane viscosities range from 500 to 80,000 centipoise. Preferably, viscosity is between 1,000 and 50,000 centipoise.

Adjustment of the ratio of vinyl groups to silyl groups is known in the art to be a formulation variable of consequence in the properties of the resultant RTV. Typical vinyl: silyl ratios are between 0.2:1 and 10:1.

The critical division between the two parts of a two-part RTV is the separation of the platinum catalyst (Part A) from polymers including silyl moieties (Part B). Otherwise, there is considerable latitude as to whether a vinyl containing species, various fillers, and additives reside in Part A or Part B or both of the composition storage components. Representative formulations are found in U.S. Pat. Nos. 3,220,972; 4,340,709; and 3,434,366.

While not wanting to be held to any particular theory, an inventive RTV silicone has a decreased shear adhesion strength relative to conventional silicones through the inclusion of an insoluble second phase, the secondary phase being insoluble with the resulting cured RTV sealant and therefore phase separating within the sealant. It is believed that the secondary phase migrates to a contact surface of a cured/vulcanized sealant thereby lowering the total shear adhesion strength of the silicone. A secondary phase operative in the present invention is made up of a highly lipophilic material illustratively including mineral oils, naphthenic oils, aromatic oils, ester-containing oils, ether-containing oils, alcohol-containing oils, and carbonyl-containing oils. Specific examples of insoluble secondary phase materials include $C_2$–$C_{24}$ esters of $C_6$–$C_{24}$ carboxylic acids such as dodecyl stearate; $C_2$–$C_{20}$ diesters of $C_2$–$C_{20}$ dicarboxylic acids such as dioctyl adipate; $C_2$–$C_{20}$ esters of $C_7$–$C_{14}$ aromatic acids such as hexyl benzoate, dioctyl biphenylate, and octyl naphthalate; $C_2$–$C_4$ dialkylene glycol dibenzoates; $C_6H_5C(O)O$—$R^1$–$(O$—$R^2)_n$—$O(O)CC_6H_5$ where $R^1$ is $C_1$–$C_4$ linear or branched alkyl or $C_2$–$C_4$ containing a substituent, $R^2$ is $C_1$–$C_4$ linear or branched alkyl or $C_2$–$C_4$ containing a substituent, n is 0 or an integer from 1 to 50 inclusive, and the substituent is a phenyl alkyl amine, dialkyl amine, a fatty acid, cycloalkyl and $C_1$–$C_4$ alkoxyl; liquid polystyrene resins; liquid polyphenol resins; liquid polyesters resins, liquid polyether resins; and combinations thereof. A secondary phase material is typically present according to the present invention from 1 to 30 total weight percent. Preferably, the secondary phase material is present from 2 to 20 total weight percent.

An inventive formulation optionally includes further additives illustratively including conventional adhesion promoters, fillers, and plasticizers known to the art. It is appreciated that shear adhesion strength of an inventive RTV is further modified through the loading of these additives.

Adhesion promoters are known to the art that increase the adhesion shear strength of an RTV silicone. Adhesion promoters known to the art illustratively include silanes, such as γ-aminopropyltriethoxysilane, γ-aminopropyltrimethoxysilane, N-(2-aminoethyl)3-aminopropyltriethoxysilane, N-(2-aminoethyl)-3-aminopropyltrimethoxysilane, γ-aminopropylmethyldiethoxysilane, γ-aminopropylmethyldimethoxysilane, N-(2-aminoethyl)-3-aminopropylmethyldiethoxysilane, N-(2-aminoethyl)-3-aminopropylmethyldimethoxysilane, ureidopropyltrialkoxysilane, trimethoxysilylpropyldiethylene triamine, 3-glycidoxypropyltrimethoxy silane, γ-mercaptopropyltrimethoxysilane and γ-methacryloxypropyltrimethoxysilane. Such adhesion promoters are typically present from 0 to 10 total weight percent.

Some fillers are known to the art to increase adhesion shear strength of an RTV silicone. An adhesion increasing filler conventional to the art is precipitated calcium carbonate. Adhesion increasing fillers are typically present from 0 to 50 total weight percent.

Adhesion reducing fillers operative herein illustratively include fumed silica, hydrophilic cellulosic fibers, ground silica, zinc oxide, calcium oxide, magnesium oxide, magnesium carbonate, clay and talc. According to the present invention, adhesion reducing fillers are present from 0 to 55 total weight percent. Preferably, the adhesion reducing filler is untreated fumed silica.

Optionally, a plasticizer is incorporated into an inventive RTV silicone. Plasticizers conventional to the art and operative herein illustratively include M-stopped polydimethylsiloxane fluids, aliphatic liquid polymers, oils, alkyl phosphates, castor oil derivatives, polyalkylene glycols, polyolefins and polyalkylenes. Typically a plasticizer is present from between 0 and 35 total weight percent plasticizer. Preferably, the plasticizer is present from 5 to 25 total weight percent.

The overall shear adhesion strength of an inventive RTV silicone is also reduced through the optional usage of a sacrificial primer. While a conventional primer serves to enhance shear adhesion strength between a given substrate and an RTV silicone, it is a substance having a decreased internal strength relative to a conventional or inventive RTV silicone such that under tensile loading, the sacrificial primer failure dictates the overall shear adhesion strength. The film-forming component of an inventive sacrificial primer illustratively includes a lower tensile strength RTV silicone relative to the seal forming overlying RTV silicone, a silicate, a polysulfide and an acrylic. Typically, a sacrificial primer is applied so as to form a film having a thickness of from about 0.05 to 5 millimeters in thickness.

The present invention is further detailed with respect to the following illustrative examples. These examples are not intended to limit the scope of the appended claims.

EXAMPLE 1

39.2 parts by weight of a silanol terminated polydimethylsiloxane having a viscosity of 80,000 centistokes is thoroughly mixed with a triorganosilyl block diorganopolysiloxane having a viscosity of 1,000 centistokes present at 5 parts by weight at 25° C. Four parts by weight of vinyl tris(methyl ethyl ketoximino)silane (VOS) is mixed therein under vacuum as a crosslinker. To this mixture, 6 parts by weight of dipropylene glycol dibenzoate ester is added until a uniform mixture is achieved. 0.7 parts by weight of pigment is added (SILVEX® 113-20-C aluminum flake), 45 parts by weight of previously dried precipitated calcium carbonate having a particle size of less than 70 nanometers (SOCAL® 322) is also uniformly mixed therethrough along with 0.1 parts by weight of dimethyl tin carboxylate. The freshly prepared compositions are applied as a 5 millimeter uniform bead to a flange surface of an transmission pan and cured in contact with a complementary aluminum frame. The amount of force needed to drive a plastic wedge between the pan and the aluminum frame is measured. The physical properties of the cured material are also measured using dumbbell-shaped pieces cut from an approximately 2 millimeter thick sheet using a tensile testing machine as cured, and after 14 days immersion at 150° C. in 5W-30 weight oil. In addition to tensile strength, elongation and hardness (Shore A) are also measured. Lap shears with steel and aluminum are also prepared with approximately 1-millimeter thick compositions for the as-prepared material and after 14 days immersion in oil as detailed above. Results from these tests are shown in Table 1.

TABLE 1

| | |
|---|---|
| Transpan Wedge Test | 43 lb |
| Dumbbell-Shaped Pieces | |
| Initial tensile strength (psi) | 286 |
| 14 day, 5W-30 oil, 150° C. tensile (psi) | 184 |
| Change in tensile strength (%) | −36% |

TABLE 1-continued

| | |
|---|---|
| Initial elongation (%) | 932 |
| 14 day, 5W-30 oil, 150° C. elongation (%) | 917 |
| Change in elongation (%) | −2% |
| Initial hardness (Shore A) | 25 |
| 14 day, 5W-30 oil, 150° C. hardness (Shore A) | 18 |
| Change in hardness (%) | −28% |
| Lap Shears (Steel) | |
| Initial tensile strength (psi) | 36 |
| 14 day, 5W-30 oil, 150° C. tensile (psi) | 58 |
| Change in tensile strength (%) | 61% |
| Lap Shears (Aluminum) | |
| Initial tensile strength (psi) | 3 |
| 14 day, 5W-30 oil, 150° C. tensile (psi) | 9 |
| Change in tensile strength (%) | 200% |
| Initial joint movement (mm) | 1 |
| 14 day, 5W-30 oil, 150° C. joint movement (mm) | 4.5 |
| Change in joint movement (%) | 350% |

EXAMPLES 2 AND 3

The procedure of Example 1 was repeated with the weight percentages of each component shown in Table 2.

TABLE 2

| | Example 2 wt % | Example 3 wt % |
|---|---|---|
| Silanol fluid | 34.81 | 32.63 |
| Al flake (SILVEX ® 113-20-C) | 0.69 | 0.65 |
| TOS*/VOS | 1.00 | 1.00 |
| VOS | 4.00 | 4.00 |
| Liquid polystyrene resin (PICCOLASTIC ® A5) | 15.00 | 20.00 |
| Precipitated calcium carbonate (SOCAL ® 322) | 44.50 | 41.72 |
| Total | 100.00 | 100.00 |

*TOS is tetra(methyl ethyl ketoxeme)silane.

Results for the cured silicones of Examples 2 and 3 are shown in Table 3.

TABLE 3

| | Example 2 | Example 3 |
|---|---|---|
| Transpan Wedge Test | 35 lb | 34 lb |
| Dumbbell-Shaped Pieces | | |
| Initial tensile strength (psi) | 156 | 102 |
| Initial elongation (%) | 360 | 251 |
| Initial hardness (Shore A) | 39 | 34 |
| Lap Shears (Steel) | | |
| Initial tensile strength (psi) | 6 | 4 |
| 14 day, 5W-30 oil, 150° C. tensile (psi) | 8 | 1.3 |
| Change in tensile strength (%) | 33% | −68% |
| Initial joint movement (mm) | 0.97 | 1.16 |
| 14 day, 5W-30 oil, 150° C. joint movement (mm) | 1.9 | 3.5 |
| Change in joint movement (%) | 96% | 202% |
| Lap Shears (Aluminum) | | |
| Initial tensile strength (psi) | 30 | 16 |
| 14 day, 5W-30 oil, 150° C. tensile (psi) | 17 | 3 |
| Change in tensile strength (%) | −43% | −81% |
| Initial joint movement (mm) | 0.73 | 0.47 |
| 14 day, 5W-30 oil, 150° C. joint movement (mm) | 0.78 | 1.45 |
| Change in joint movement (%) | 7% | 209% |

In contrast to the compositions of Examples 1–3 corresponding to an inventive composition, a conventional RTV formulation lacking an immiscible secondary phase material exhibited transpan wedge test values of 476 pounds such that separation of two adhered substrates necessarily caused deformational damage to the substrates upon disassembly.

EXAMPLE 4

A two-component silicone composition is prepared with Part A containing 38.9 parts by weight of a linear vinyl terminated polydimethylsiloxane having a viscosity of 3,500 centistokes and 0.17% by weight vinyl functionality is thoroughly mixed with 8 parts by weight dipropylene glycol dibenzoate ester. 8.71 parts by weight fumed silica and 46.44 parts by weight previously dried precipitated calcium carbonate having a particle size of less than 70 nanometers (SOCAL® 322) is also uniformly mixed therethrough along with 0.06 parts by weight of a 2½% by weight of an aqueous cloroplatinic acid solution. Part B is prepared by combining 1.45 parts by weight of a linear polydimethylsiloxane terminated with hydrogen dimethylsilyl moieties where the polydimethylsiloxane has a molecular weight average of 17,500. To this is added 2.15 parts by weight of a copolymer containing dimethyl hydrogen methyl polysiloxane units terminating in trimethylsilyl moieties in which the copolymer contains at least 3 reactive silyl groups per copolymer and 1.65 weight percent of reactive hydrogen bonded to silicon.

With the combination of Parts A and B, the resulting composition is applied and characterized as detailed with respect to Example 1 with comparable results being noted.

Patents mentioned in the specification are indicative of the levels of those skilled in the art to which the invention pertains. These patents are incorporated herein by reference to the same extent as if each individual patent was specifically and individually incorporated herein by reference.

The foregoing description is illustrative of particular embodiments of the invention, but is not meant to be a limitation upon the practice thereof. One skilled in the art will readily appreciate variations and modifications of the present invention that nonetheless remain within the spirit of the invention.

The invention is claimed is:

1. An RTV silicone composition comprising:
    a silicon base material wherein said silicone base material comprises a diorganopolysiloxane, a condensation catalyst, and a crosslinking agent reactive with said diorganopolysiloxane;
    lipophilic secondary phase insoluble in said silicone base material upon cure so as to yield a shear adhesion strength of less than 50 pounds per square inch on a steel or aluminum substrate.

2. The composition of claim 1 wherein the shear adhesion strength is between 15 and 35 pounds per square inch.

3. The composition of claim 1 wherein said lipophilic secondary phase is present in an amount of between 1 and 30 total weight percent.

4. The composition of claim 1 wherein said lipophilic secondary phase is selected from the group consisting of: mineral oils, naphthenic oils, aromatic oils, ester-containing oils, ether-containing oils, alcohol-containing oils, and carbonyl-containing oils.

5. The composition of claim 1 further comprising at least one additive selected from the group consisting of an adhesion promoter, a filler, and a plasticizer.

6. The composition of claim 2 wherein said lipophilic secondary phase is an ester-containing oil.

7. The composition of claim 1 wherein said lipophilic secondary phase is selected from the group consisting of: $C_2$–$C_{24}$ esters of $C_6$–$C_{24}$ carboxylic acid, $C_2$–$C_{20}$ diesters of $C_2$–$C_{20}$ dicarboxylic acids, $C_2$–$C_{20}$ esters of $C_7$–$C_{16}$ aromatic acids.

8. The composition of claim 1 wherein said lipophilic secondary phase is $C_2$–$C_4$ dialkylene glycol dibenzoates.

9. The composition of claim 1 wherein said lipophilic secondary phase is a liquid resin selected from the group consisting of: polystyrene, polyphenol, polyester and polyether.

10. An RTV silicone composition comprising:
    a silicon base material wherein said silicone base material comprises a two-part composition comprising in Part A a platinum group catalyst, in Part B a SiH terminated polymer and a SiH crosslinker, and vinyl terminated polymer in at least one of Part A and Part B;
    a lipophilic secondary phase insoluble in said silicone base material upon cure so as to yield a shear adhesion strength of less than 50 pounds per square inch on a steel or aluminum substrate.

11. The composition of claim 10 wherein the shear adhesion strength is between 15 and 35 pounds per square inch.

12. The composition of claim 10 wherein said lipophilic secondary phase is present in an amount of between 1 and 30 total weight percent.

13. The composition of claim 10 wherein said lipophilic secondary phase is selected from the group consisting of: mineral oils, naphthenic oils, aromatic oils, ester-containing oils, ether-containing oils, alcohol-containing oils, and carbonyl-containing oils.

14. The composition of claim 10 further comprising at least one additive selected from the group consisting of: an adhesion promoter, a filler, and a plasticizer.

15. The composition of claim 11 wherein said lipophilic secondary phase is an ester-containing oil.

16. The composition of claim 10 wherein said lipophilic secondary phase is selected from the group consisting of: $C_2$–$C_{24}$ esters of $C_6$–$C_{24}$ carboxylic acid, $C_2$–$C_{20}$ diesters of $C_2$–$C_{20}$ dicarboxylic acids, $C_2$–$C_{20}$ esters of $C_7$–$C_{16}$ aromatic acids.

17. The composition of claim 10 wherein said lipophilic secondary phase is $C_2$–$C_4$ dialkylene glycol dibenzoates.

18. The composition of claim 10 wherein said lipophilic secondary phase is $C_6H_5C(O)O$—$R^1$—$(O$—$R^2)_a$—$O(O)CC_6H_5$ where $R^1$ is $C_1$–$C_4$ linear or branched alkyl or $C_2$–$C_4$ containing a substituent, $R^2$ is $C_1$–$C_4$ linear or branched alkyl or $C_2$–$C_4$ containing a substituent, n is 0 or an integer from 1 to 50 inclusive, and the substituent is a phenyl alkyl amine, dialkyl amine, a fatty acid, cycloalkyl and $C_1$–$C_4$ alkoxyl.

19. The composition of claim 10 wherein said lipophilic secondary phase is a liquid resin selected from the group consisting of: polystyrene, polyphenol, polyester and polyether.

20. An RTV silicone composition comprising:
    a silicon base material;
    a lipophilic secondary phase insoluble in said silicone base material upon cure so as to yield a shear adhesion strength of less than 50 pounds per square inch on a steel or aluminum substrate wherein said lipophilic secondary phase is $C_6H_5C(O)O$—$R^1$—$(O$—$R^2)_n$—$O(O)CC_6H_5$ where $R^1$ is $C_1$–$C_4$ linear or branched alkyl or $C_2$–$C_4$ containing a substituent, $R^2$ is $C_1$–$C_4$ linear or branched alkyl or $C_2$–$C_4$ containing a substituent, n is 0 or an integer from 1 to 50 inclusive, and the substituent is a phenyl alkyl amine, dialkyl amine, a fatty acid, cycloalkyl and $C_1$–$C_4$ alkoxyl.

21. The composition of claim 20 wherein the shear adhesion strength is between 15 and 35 pounds per square inch.

22. The composition of claim 20 further comprising at least one additive selected from the group consisting of: an adhesion promoter, a filler, and a plasticizer.

23. A seal structure comprising:
a first substrate having a first surface;
a second substrate complementary to the first surface;
a sacrificial primer applied to the first surface and having a shear adhesion strength of less than 50 pounds per square inch on a steel or aluminum substrate and comprising a film-forming polymer selected from the group consisting of: a silicone, a silicate, a polysulfide, and an acrylic; and
an RTV silicone composition overlying said sacrificial primer and intermediate between said first substrate and said second substrate.

24. The seal structure of claim 23 wherein said RTV silicone composition is an RTV silicone composition comprising:
a silicone base material comprising: a diorganopolysiloxane; a condensation catalyst; and a crosslinking agent reactive with said diorganopolysiloxane to yield a polymer having a molecular weight; and
a lipophilic secondary phase insoluble in said silicone base material upon cure so as to yield a shear adhesion strength of less than 50 pounds per square inch.

25. The seal structure of claim 23 wherein said sacrificial primer is an RTV silicone composition comprising:
a silicone base material; and
a lipophilic secondary phase insoluble in said silicone base material upon cure so as to yield a shear adhesion strength of less than 50 pounds per square inch.

26. The seal structure of claim 25 wherein said silicone base comprises a diorganopolysiloxane, a condensation catalyst, and a crosslinking agent reactive with said diorganopolysiloxane.

27. The composition of claim 25 wherein said silicone base material comprises a two-part composition comprising in Part A a platinum group catalyst, in Part B a SiH terminated polymer and a SiH crosslinker, and vinyl terminated polymer in at least one of Part A and Part B.

28. The seal structure of claim 23 further comprising a layer of said sacrificial primer intermediate between said RTV silicone composition and said second substrate.

29. An RTV silicone composition consisting essentially of:
a silicone base material comprising a two-part composition comprising in Part A a platinum group catalyst, in Part B a SiH terminated polymer and a SiH crosslinker, and vinyl terminated polymer in at least one of Part A and Part B;
a condensation catalyst;
a crosslinking agent;
between 2 and 20 total weight percent of a lipophilic secondary phase insoluble in a cured silicone; and
optionally at least additive selected from an adhesion promoter, pigment, filler and plasticizer.

* * * * *

UNITED STATES PATENT AND TRADEMARK OFFICE
CERTIFICATE OF CORRECTION

| | | |
|---|---|---|
| PATENT NO. | : 7,205,050 B2 | Page 1 of 1 |
| APPLICATION NO. | : 10/864148 | |
| DATED | : April 17, 2007 | |
| INVENTOR(S) | : Hans E. Haas | |

It is certified that error appears in the above-identified patent and that said Letters Patent is hereby corrected as shown below:

On The Title Page, Item (56), replace "4,735,979" with -- 4,735,973 --

Column 5, line 45, replace "an transmission" with -- a transmission --

Column 8, line 44, replace "$(O-R^2)_a$" with -- $(O-R^2)_n$ --

Column 8, line 62, replace "$(O)CC_5H_5$" with -- $(O)CC_6H_5$ --

Signed and Sealed this

Seventh Day of August, 2007

JON W. DUDAS
*Director of the United States Patent and Trademark Office*